United States Patent
Wang et al.

(10) Patent No.: US 10,126,477 B2
(45) Date of Patent: Nov. 13, 2018

(54) OPTICAL COMPENSATION FILM AND METHOD FOR MANUFACTURING THE SAME, POLARIZER, LIQUID CRYSTAL DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yongcan Wang, Beijing (CN); Hongming Zhan, Beijing (CN); Lifeng Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 14/916,641

(22) PCT Filed: Oct. 30, 2015

(86) PCT No.: PCT/CN2015/093369
§ 371 (c)(1),
(2) Date: Mar. 4, 2016

(87) PCT Pub. No.: WO2016/066133
PCT Pub. Date: May 6, 2016

(65) Prior Publication Data
US 2016/0299275 A1    Oct. 13, 2016

(30) Foreign Application Priority Data
Oct. 31, 2014 (CN) .......................... 2014 1 0602634

(51) Int. Cl.
*G02F 1/13363* (2006.01)
*G02B 5/30* (2006.01)
(Continued)

(52) U.S. Cl.
CPC ......... *G02B 5/3083* (2013.01); *G02B 5/3016* (2013.01); *G02B 5/3025* (2013.01);
(Continued)

(58) Field of Classification Search
CPC ............. G02F 1/13363; G02F 2202/40; G02F 2001/133638; G02F 1/133528;
(Continued)

(56) References Cited

U.S. PATENT DOCUMENTS

| | | | |
|---|---|---|---|
| 2008/0062375 A1 | 3/2008 | Naka | |
| 2012/0002140 A1* | 1/2012 | Hatoyama | G02F 1/1337 349/76 |
| 2014/0168557 A1* | 6/2014 | Qin | G02F 1/133528 349/43 |

FOREIGN PATENT DOCUMENTS

| | | |
|---|---|---|
| CN | 102257428 A | 11/2011 |
| CN | 103018962 A | 4/2013 |

(Continued)

OTHER PUBLICATIONS

Second Office Action regarding Chinese application No. 201410602634.4, dated Dec. 9, 2016. Translation provided by Dragon Intellectual Property Law Firm.
(Continued)

*Primary Examiner* — Jia Pan
(74) *Attorney, Agent, or Firm* — Harness, Dickey & Pierce, P.L.C.

(57) ABSTRACT

The present disclosure relates to the field of display technology, and provides an optical compensation film, its manufacturing method, a polarizer, a liquid crystal display panel and a display device. The optical compensation film includes a first substrate, a second substrate arranged opposite to the first substrate, a first alignment layer arranged at a side of the first substrate opposite to the second substrate,
(Continued)

a second alignment layer arranged at a side of the second substrate opposite to the first substrate, and a first liquid crystal layer arranged between the first alignment layer and the second alignment layer, wherein the first liquid crystal layer is provided with a predetermined pretilt angle.

12 Claims, 3 Drawing Sheets

(51) Int. Cl.
    *G02F 1/1335*     (2006.01)
    *G02F 1/1337*     (2006.01)
    *G02F 1/1347*     (2006.01)

(52) U.S. Cl.
    CPC .......... *G02F 1/1335* (2013.01); *G02F 1/1337* (2013.01); *G02F 1/1347* (2013.01); *G02F 1/13363* (2013.01); *G02F 1/133528* (2013.01); *G02F 2001/133749* (2013.01)

(58) Field of Classification Search
    CPC ................ G02F 1/1335; G02F 1/1337; G02F 2001/133749; G02F 1/0322; G02F 1/1347; G02B 5/3083; G02B 5/3016; G02B 5/3025; G02B 5/3033
    See application file for complete search history.

(56) References Cited

FOREIGN PATENT DOCUMENTS

| | | |
|---|---|---|
| CN | 103364993 A | 10/2013 |
| CN | 104297993 A | 1/2015 |

OTHER PUBLICATIONS

First Office Action regarding Chinese application No. 201410602634.4, dated Aug. 2, 2016. Translation provided by Dragon Intellectual Property Law Firm.
Written Opinion of the International Searching Authority for international application No. PCT/CN2015/093369.
European Search Report regarding Application No. 15837075.9 dated May 9, 2018.

\* cited by examiner

OPTICAL COMPENSATION FILM AND METHOD FOR MANUFACTURING THE SAME, POLARIZER, LIQUID CRYSTAL DISPLAY PANEL AND DISPLAY DEVICE

CROSS-REFERENCE TO RELATED APPLICATION

The present application is the U.S. national phase of PCT Application No. PCT/CN2015/093369 filed on Oct. 30, 2015, which claims a priority of the Chinese patent application No. 201410602634.4 filed on Oct. 31, 2014, each of which are incorporated herein by reference in their entirety.

TECHNICAL FIELD

The present disclosure relates to the field of display technology, in particular to an optical compensation film and a method for manufacturing the same, a polarizer, a liquid crystal display panel and a display device.

BACKGROUND

Currently, thin film transistor liquid crystal display (TFT-LCD) is mainly used in a display product. An advanced super dimension switch (ADS) technique has been widely used in various display products due to its advantages such as high resolution, high light transmittance, low power consumption, wide viewing angle, high aperture ratio, low chromatic aberration, and being free of push Mura. Its core features may be described as forming a multi-dimensional electric field by means of electrical fields generated at edges of slit electrodes within an identical plane and an electrical field generated between a slit electrode layer and a plate electrode layer, so as to enable all the liquid crystal molecules between the slit electrodes and right above the electrodes within a liquid crystal cell to rotate, thereby to improve the operational efficiency of the liquid crystal molecules and enhance the light transmission efficiency.

Optical efficiency is one of the principal factors that may affect a LCD display effect. Depending on a phase delay of a liquid crystal unit, its display effect may be determined by the optical efficiency, which is expressed as $d \times \Delta n$, where d represents a thickness of a liquid crystal layer between an upper substrate and a lower substrate of a liquid crystal display panel, and $\Delta n$ represents a birefringence difference of liquid crystals. At an initial white-light level, white light beams may be viewed by human eyes. When it is shifted gradually to a middle grayscale and the red-light transmittance increases, a color of the LCD viewed by the human eyes is not white any more, and instead, chromatic aberration slightly shifted toward yellow may occur. The so-called "yellowish" phenomenon is just one of the principal causes for the deterioration in the image quality of the display.

During the manufacture of the liquid crystal display panel, there is inevitably a certain pretilt angle of the liquid crystal layer relative to a surface of an alignment layer due to a rubbing alignment process (i.e., it is impossible for the pretilt angle of the liquid crystal layer to be 0°). At this time, when a left viewing angle is identical to a right viewing angle, liquid crystal axial directions viewed at the left viewing angle and the right viewing angle are different from each other, thereby $\Delta n$ for the left viewing angle is different from that for the right viewing angle. Because d is of an identical value when the left viewing angle is identical to the right viewing angle, the phase delay $\Delta n \times d$ for the left viewing angle is different from that for the right viewing angle, and different optical path differences may occur. At this time, the light beams transmitted through liquid crystal display panel may be of different wavelengths, resulting in the chromatic aberration, which is more apparent in a dark state. As a result, the display effect of the liquid crystal display panel will be adversely affected.

SUMMARY

An object of the present disclosure is to provide an optical compensation film and a method for manufacturing the same, a polarizer, a liquid crystal display panel, and a display device, so as to prevent the occurrence of chromatic aberration for the liquid crystal display panel in a dark state or at a specific viewing angle.

In one aspect, the present disclosure provides in some embodiments an optical compensation film, including a first substrate, a second substrate arranged opposite to the first substrate, a first alignment layer arranged at a side of the first substrate opposite to the second substrate, a second alignment layer arranged at a side of the second substrate opposite to the first substrate, and a first liquid crystal layer arranged between the first alignment layer and the second alignment layer, wherein the first liquid crystal layer is provided with a predetermined pretilt angle.

Further, the first liquid crystal layer includes positive uniaxial liquid crystals.

Further the predetermined pretilt angle is 2°.

In another aspect, the present disclosure provides in some embodiments a method for manufacturing an optical compensation film, including: providing a first substrate, providing a second substrate opposite to the first substrate, forming a first alignment layer at a side of the first substrate opposite to the second substrate, forming a second alignment layer at a side of the second substrate opposite to the first substrate, and forming a first liquid layer between the first alignment layer and the second alignment layer, wherein the first liquid layer is provided with a predetermined pretilt angle.

Further, the first liquid crystal layer includes positive uniaxial liquid crystals.

Further, the predetermined pretilt angle is 2°.

In yet another aspect, the present disclosure provides in some embodiments a polarizer including the above-mentioned optical compensation film.

In still yet another aspect, the present disclosure provides in some embodiments a liquid crystal display panel, including a lower polarizer, an array substrate, a second liquid crystal layer, a color filter substrate and an upper polarizer arranged sequentially in a first direction perpendicular to the liquid crystal display panel, and optical compensation films.

Further, the optical compensation films include a first optical compensation film and a second optical compensation film. The first and the second optical compensation films each includes a first substrate, a second substrate arranged opposite to the first substrate, a first alignment layer arranged at a side of the first substrate opposite to the second substrate, a second alignment layer arranged at a side of the second substrate opposite to the first substrate, and a first liquid crystal layer arranged between the first alignment layer and the second alignment layer, wherein the first liquid crystal layer is provided with a predetermined pretilt angle. The lower polarizer, the first optical compensation film, the array substrate, the second liquid crystal layer, the color filter substrate, the second optical compensation film and the upper polarizer in the liquid crystal display panel are arranged sequentially in the first direction.

Further, a sum of the pretilt angle of the first liquid crystal layer and a pretilt angle of the second liquid crystal layer is 180°.

Further, the first liquid crystal layer includes positive uniaxial liquid crystals.

Further, the predetermined pretilt angle is 2°.

Further, the lower polarizer and the upper polarizer are each provided with the optical compensation film.

In still yet another aspect, the present disclosure provides in some embodiments a display device including the above-mentioned liquid crystal display panel.

According to the embodiments of the present disclosure, the liquid crystal display panel is provided with two optical compensation films, and a sum of the pretilt angle of the liquid crystal layer of each optical compensation film and the pretilt angle of the liquid crystal layer of the liquid crystal display panel is 180°. In other words, the pretilt angle of the liquid crystal layer of each optical compensation film is complementary to that of the liquid crystal layer of the liquid crystal display panel, so as to enable the final pretilt angle of the liquid crystal layers of the liquid crystal display panel to be 0°. As a result, it is able to prevent the occurrence of the chromatic aberration for the liquid crystal display panel in a dark state or at a specific viewing angle, thereby to improve the display effect of liquid crystal display panel.

DETAILED DESCRIPTION OF THE EMBODIMENTS

Figure 1:
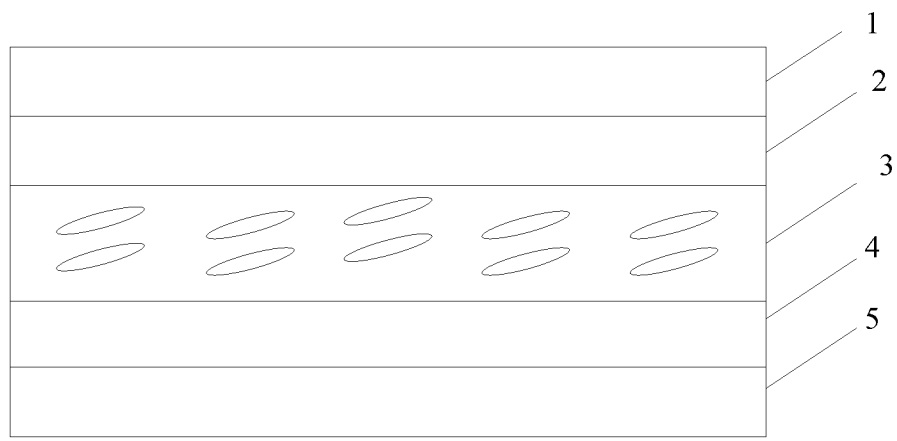
FIG. 1 is a schematic view showing an ADS liquid crystal display panel in the related art.

In order to make the objects, the technical solutions and the advantages of the present disclosure more apparent, the present disclosure will be described hereinafter in conjunction with the drawings and embodiments.

For the liquid crystal display panel in the related art, it is impossible for a pretilt angle of a liquid crystal layer to be 0°, so there is light leakage or a certain phase delay in a dark state, and a chromatic aberration may easily occur. In this regard, the present disclosure provides in some embodiments an optical compensation film and a method for manufacturing the same, a polarizer, a liquid crystal display panel and a display device, so as to prevent the occurrence of the chromatic aberration for the liquid crystal display panel in the dark state or at a specific viewing angle.

The optical compensation film in some embodiments of the present disclosure includes a first substrate, a second substrate arranged opposite to the first substrate, a first alignment layer arranged at a side of the first substrate opposite to the second substrate, a second alignment layer arranged at a side of the second substrate opposite to the first substrate, and a first liquid crystal layer arranged between the first alignment layer and the second alignment layer, wherein the first liquid crystal layer is provided with a predetermined pretilt angle.

The optical compensation film may be applied to a liquid crystal display panel. A sum of the pretilt angle of the liquid crystal layer of the optical compensation film and the pretilt angle of the liquid crystal layer of the liquid crystal display panel is 180°. In other words, the pretilt angle of the liquid crystal layer of the optical compensation film is complementary to that of the liquid crystal layer of the liquid crystal display panel, such that a final pretilt angle of the liquid crystal layers of the liquid crystal display panel to be 0°. As a result, it is able to prevent the occurrence of the chromatic aberration for the liquid crystal display panel in a dark state or at a specific viewing angle, thereby to improve the display effect of liquid crystal display panel.

Alternatively, the first liquid crystal layer includes positive uniaxial liquid crystals.

For the liquid crystal display panel, the smaller the pretilt angle of the liquid crystal layer, the better, and ideally, the pretilt angle is 0°. In an actual process, the pretilt angle of the liquid crystal layer is usually 2°. For the optical compensation film in the embodiments of the present disclosure, the pretilt angle of the liquid crystal layer is 2° and in a direction opposite to the pretilt angle of the liquid crystal layer of the liquid crystal display panel.

The method for manufacturing the optical compensation film in some embodiments of the present disclosure includes steps of providing a first substrate, providing a second substrate opposite to the first substrate, forming a first alignment layer at a side of the first substrate opposite to the second substrate, forming a second alignment layer at a side of the second substrate opposite to the first substrate, and forming a first liquid layer between the first alignment layer and the second alignment layer, wherein the first liquid crystal layer is provided with a predetermined pretilt angle.

The optical compensation film manufactured herein may be applied to a liquid crystal display panel. A sum of the pretilt angle of the liquid crystal layer of the optical compensation film and the pretilt angle of the liquid crystal layer of the liquid crystal display panel is 180°. In other words, the pretilt angle of the liquid crystal layer of the optical compensation film is complementary to that of the liquid crystal layer of the liquid crystal display panel, such that the final pretilt angle of the liquid crystal layers of the liquid crystal display panel may be 0°. As a result, it is able to prevent the occurrence of the chromatic aberration for the liquid crystal display panel in a dark state or at a specific viewing angle, thereby to improve the display effect of liquid crystal display panel.

Alternatively, the first liquid crystal layer includes positive uniaxial liquid crystals.

For the liquid crystal display panel, the smaller the pretilt angle of the liquid crystal layer, the better, and ideally, the pretilt angle is 0°. In an actual process, the pretilt angle of the liquid crystal layer is usually 2°. For the optical compensation film in the embodiments of the present disclosure, the pretilt angle of the liquid crystal layer is 2° and in a direction opposite to the pretilt angle of the liquid crystal layer of the liquid crystal display panel.

The polarizer in the embodiments of the present disclosure includes the above-mentioned optical compensation film.

The liquid crystal display panel in the embodiments of the present disclosure includes a lower polarizer, an array substrate, a second liquid crystal layer, a color filter substrate and an upper polarizer arranged sequentially from the bottom up, and the above-mentioned optical compensation films. A sum of the pretilt angle of the first liquid crystal layer and the pretilt angle of the second liquid crystal layer is 180°.

According to the embodiments of the present disclosure, the liquid crystal display panel is provided with two optical compensation films, and a sum of the pretilt angle of the liquid crystal layer of each optical compensation film and the pretilt angle of the liquid crystal layer of the liquid crystal display panel is 180°. In other words, the pretilt angle of the liquid crystal layer of each optical compensation film is complementary to that of the liquid crystal layer of the liquid crystal display panel, such that the final pretilt angle of the liquid crystal layers of the liquid crystal display panel may be 0°. As a result, it is able to prevent the occurrence of the chromatic aberration for the liquid crystal display panel in a dark state or at a specific viewing angle, thereby to improve the display effect of liquid crystal display panel.

To be specific, one of the optical compensation films is arranged between the color filter substrate and the upper polarizer, and the other optical compensation film is arranged between the array substrate and the lower polarizer.

The display device in the embodiments of the present disclosure includes the above-mentioned liquid crystal display panel. The display device may be any product or member having a display function, such as a liquid crystal television, a liquid crystal display, a digital photo frame, a mobile phone, or a flat-panel computer.

The present disclosure will be described hereinafter in conjunction with the drawings by taking an ADS liquid crystal display panel as an example.

As shown in FIG. 1, which is a schematic view showing an existing ADS liquid crystal display panel, the ADS liquid crystal display panel includes a color filter substrate 2, an array substrate 4, and a liquid crystal layer 3 arranged between the color filter substrate 2 and the array substrate 4. An upper polarizer 1 is arranged at a side of the color filter substrate 2 away from the array substrate 4, and a lower polarizer 5 is arranged at a side of the array substrate 4 away from the color filter substrate 2.

During the manufacture of the liquid crystal display panel, there is inevitably a certain pretilt angle of the liquid crystal layer 3 relative to a surface of an alignment layer due to a rubbing alignment process (i.e., it is impossible for the pretilt angle of the liquid crystal layer 3 to be 0°). At this time, there is light leakage or a certain phase delay for the ADS product in the dark state. As a result, the chromatic aberration may easily occur, and the application of the ADS product will be adversely affected. For example, the chromaticity in the dark state is highly demanded in medical display, and when a scanned image of a patient is viewed, it is required to prevent the occurrence of chromatic aberration, so as to prevent the misjudgment. Hence, the application of the ADS liquid crystal display panel in the medical display will be adversely affected due to the chromatic aberration.

Figure 2:
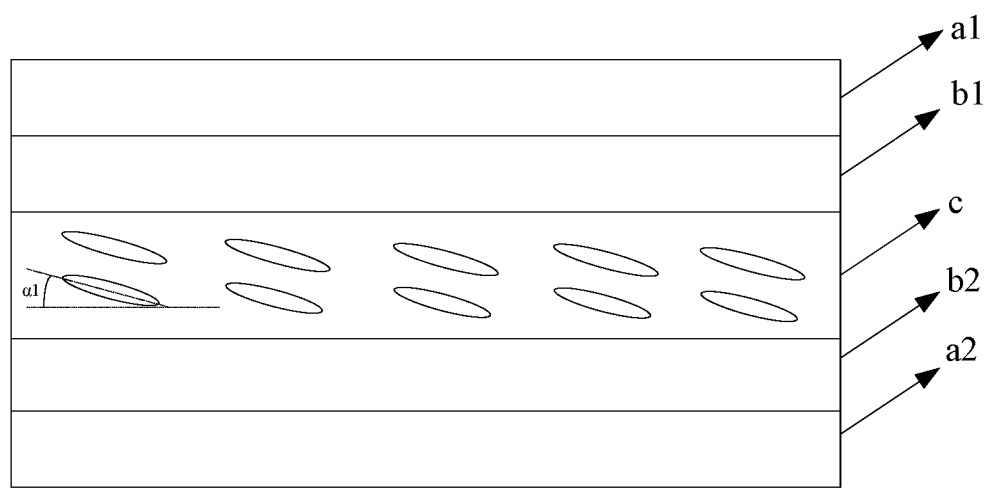
FIG. 2 is a schematic view showing an optical compensation film according to at least one embodiment of the present disclosure.

In order to improve the chromatic aberration of the ADS liquid crystal display panel, the present disclosure provides in one embodiment an optical compensation film which, as shown in FIG. 2, includes a first substrate a1, a second substrate a2 arranged opposite to the first substrate a1, a first alignment layer b1 arranged at a side of the first substrate a1 opposite to the second substrate a2, a second alignment layer b2 arranged at a side of the second substrate a2 opposite to the first substrate a1, and a first liquid crystal layer c arranged between the first alignment layer b1 and the second alignment layer b2 and provided with a predetermined pretilt angle $\alpha 1$.

Through the optical compensation film in the embodiments of the present disclosure, it is able to prevent the occurrence of the chromatic aberration for the existing ADS liquid crystal display panel in the dark state or at a specific viewing angle. The existing optical compensation film is mainly used to improve contrast as well as a viewing angle. For the ADS liquid crystal display panel, its viewing angle and contrast are well enough, and it is able to provide a full viewing angle even without any improvement. The optical compensation film in the embodiments of the present disclosure may be used to prevent the occurrence of the chromatic aberration for the existing ADS liquid crystal display panel in the dark state or at a specific viewing angle.

Figure 3:
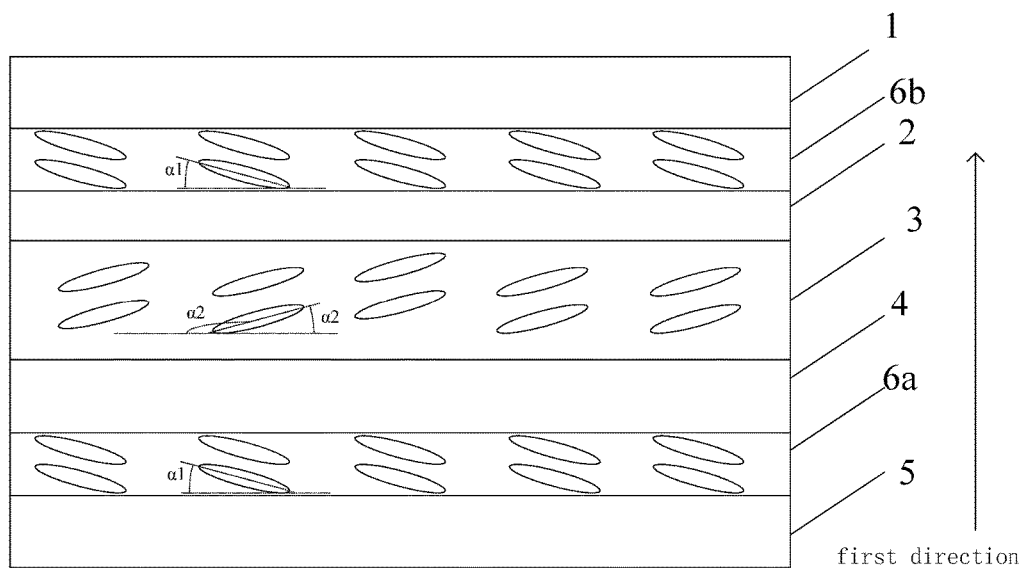
FIG. 3 is a schematic view showing an ADS liquid crystal display panel according to at least one embodiment of the present disclosure.

FIG. 3 shows an ADS liquid crystal display panel according to one embodiment of the present disclosure. As compared with the existing ADS liquid crystal display panel in FIG. 1, a second optical compensation film 6b is arranged between the upper polarizer 1 and the color filter substrate 2, and a first optical compensation film 6a is arranged between the lower polarizer 5 and the array substrate 4. The optical compensation film 6a and 6b each includes two substrates arranged opposite to each other, and a liquid crystal layer arranged between the two substrates, wherein the liquid crystal layer is provided with a predetermined pretilt angle $\alpha 1$. As shown in FIG. 3, the pretilt angle $\alpha 1$ of the liquid crystal layer of each of the optical compensation films 6a and 6b is complementary to the pretilt angle of the liquid crystal layer of the ADS liquid crystal display panel, so that the final pretilt angle of the liquid crystal layers of the entire ADS liquid crystal display panel is 0°.

The liquid crystal layer of each of the optical compensation films 6a and 6b includes positive uniaxial liquid crystals. Because the liquid crystal layer of the ADS liquid crystal display panel also includes the positive uniaxial liquid crystals, $\Delta n$ for the liquid layer of each optical compensation film is identical to that for the liquid crystal layer of the ADS liquid crystal display panel, and a resultant phase delay is the same too in the case of an identical viewing angle. When the pretilt angle $\alpha 1$ of the liquid crystal layer of each optical compensation film is complementary to the pretilt angle $\alpha 2$ of the liquid crystal layer of the ADS liquid crystal display panel, the resultant phase delay may be used to cancel out the chromatic aberration generated due to the phase delay. When the other kinds of liquid crystals are used, it is impossible to compensate for the chromatic aberration due to the different $\Delta n$.

Figure 4:
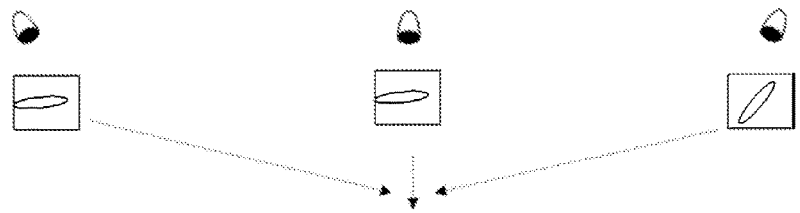
FIG. 4 is a schematic view showing a principle for the occurrence of chromatic aberration for the ADS liquid crystal display panel in the related art.
Figure 4:
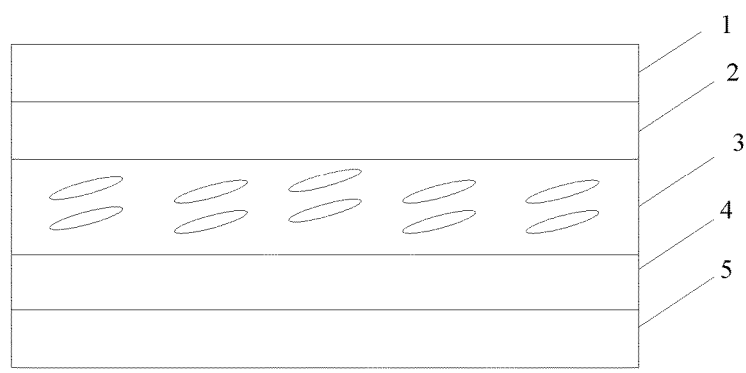

FIG. 4 shows the principle for the occurrence of the chromatic aberration for the existing ADS liquid crystal display panel. When a light beam is of a standard wavelength $\lambda$ of 589 nm, $\Delta n$ of the liquid crystal layer is ne-no, where ne represents a refractive index of the liquid crystal in a long-axis direction, and no represents a refractive index of the liquid crystal in a short-axis direction. Due to the pretilt angle of the liquid crystal layer, $\Delta n$ changes along with the viewing angle. For the existing ADS liquid crystal display panel, when $\Delta n \times d = \lambda/2$ (d represents a thickness of the liquid crystal layer), a normal white color is displayed (at a center viewing angle), when $\Delta n \times d < \lambda/2$, the chromatic aberration shifted toward blue light occurs ($\Delta n$ for the right viewing angle decreases), and when $\Delta n \times d > \lambda/2$, the chromatic aberration shifted toward yellow light occurs ($\Delta n$ for the left viewing angle increases).

Figure 5:
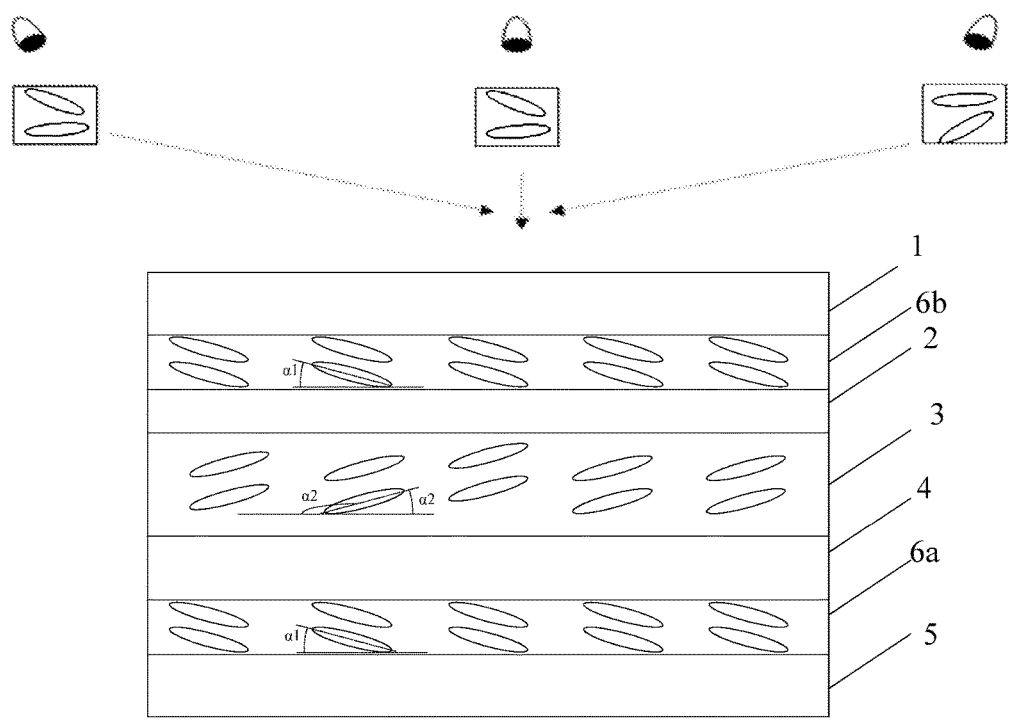
FIG. 5 is a schematic view showing a principle for the prevention of a chromatic aberration for the ADS liquid crystal display panel according to at least one embodiment of the present disclosure.

As shown in FIG. 5, which is a schematic view showing the principle for the prevention of the chromatic aberration for the ADS liquid crystal display panel according to one embodiment of the present disclosure, after the ADS liquid crystal display panel is provided with optical compensation film, a sum of the pretilt angle of the liquid crystal layer of the optical compensation film and the pretilt angle of the liquid crystal layer of the ADS liquid crystal display panel is 180°. In other words, the pretilt angle of the liquid crystal layer of the optical compensation film is complementary to that of the liquid crystal layer of the liquid crystal display panel, so as to enable the final pretilt angle of the liquid crystal layers of the liquid crystal display panel to be 0°. At this time, Δn is of a constant value but does not change along with the viewing angle. As a result, it is able to prevent the occurrence of the chromatic aberration for the ADS Liquid crystal display panel in the dark state or at a specific viewing angle, thereby to improve the display effect of the ADS liquid crystal display panel.

In the actual process, the pretilt angle of the liquid crystal layer of the ADS liquid crystal display panel is usually 2°. Hence, for the optical compensation film in the embodiments of the present disclosure, the pretilt angle of its liquid crystal layer may also be set as 2°.

The existing polarizer may further be improved, e.g., the existing polarizer may also be provided with the optical compensation films 6a and 6b. In this way, when the novel polarizer is attached onto the color filter substrate and the array substrate of the ADS liquid crystal display panel, it is also able to prevent the occurrence of the chromatic aberration for the ADS liquid crystal display panel in the dark state or at a specific viewing angle.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An optical compensation film, comprising:
   a first substrate;
   a second substrate arranged opposite to the first substrate;
   a first alignment layer arranged at a side of the first substrate opposite to the second substrate;
   a second alignment layer arranged at a side of the second substrate opposite to the first substrate; and
   a first liquid crystal layer arranged between the first alignment layer and the second alignment layer, wherein liquid crystal molecules of the first liquid crystal layer are provided an Identical pretilt angle, and the identical pretilt angle is 2 degrees.

2. The optical compensation film according to claim 1, wherein the first liquid crystal layer comprises positive uniaxial liquid crystals.

3. A method for manufacturing an optical compensation film, comprising:
   providing a first substrate;
   providing a second substrate opposite to the first substrate;
   forming a first alignment layer at a side of the first substrate opposite to the second substrate;
   forming a second alignment layer at a side of the second substrate opposite to the first substrate; and
   forming a first liquid crystal layer between the first alignment layer and the second alignment layer, wherein liquid crystal molecules of the first liquid layer are provided with an identical pretilt angle, and the identical pretilt angle is 2 degrees.

4. The method according to claim 3, wherein the first liquid crystal layer comprises positive uniaxial liquid crystals.

5. A polarizer, comprising the optical compensation film according to claim 1.

6. The polarizer according to claim 5, wherein the first liquid crystal layer comprises positive uniaxial liquid crystals.

7. A liquid crystal display panel, comprising a lower polarizer, an array substrate, a second liquid crystal layer, a color filter substrate and an upper polarizer arranged sequentially in a first direction perpendicular to the liquid crystal display panel, and optical compensation films;
   wherein the optical compensation films comprise a first optical compensation film and a second optical compensation film, wherein the first and the second optical compensation films each comprises:
   a first substrate;
   a second substrate arranged opposite to the first substrate;
   a first alignment layer arranged at a side of the first substrate opposite to the second substrate;
   a second alignment layer arranged at a side of the second substrate opposite to the first substrate; and
   a first liquid crystal layer arranged between the first alignment layer and the second alignment layer, wherein liquid crystal molecules of the first liquid crystal layer are provided with an identical pretilt angle, and the identical pretilt angle is 2 degrees.

8. The liquid crystal display panel according to claim 7, wherein
   the lower polarizer, the first optical compensation film, the array substrate, the second liquid crystal layer, the color filter substrate, the second optical compensation film and the upper polarizer in the liquid crystal display panel are arranged sequentially in the first direction.

9. The liquid crystal display panel according to claim 8, wherein a sum of the pretilt angle of the first liquid crystal layer and a pretilt angle of the second liquid crystal layer is 180 degrees.

10. The liquid crystal display panel according to claim 8, wherein the first liquid crystal layer comprises positive uniaxial liquid crystals.

11. The liquid crystal display panel according to claim 7, wherein the lower polarizer and the upper polarizer are each provided with the optical compensation film.

12. A display device, comprising the liquid crystal display panel according to claim 7.

* * * * *